Nov. 12, 1940.                P. DINKEL                2,221,577
           MACHINE FOR MARKING SCALES ON WORK PIECES
                      Filed April 8, 1938
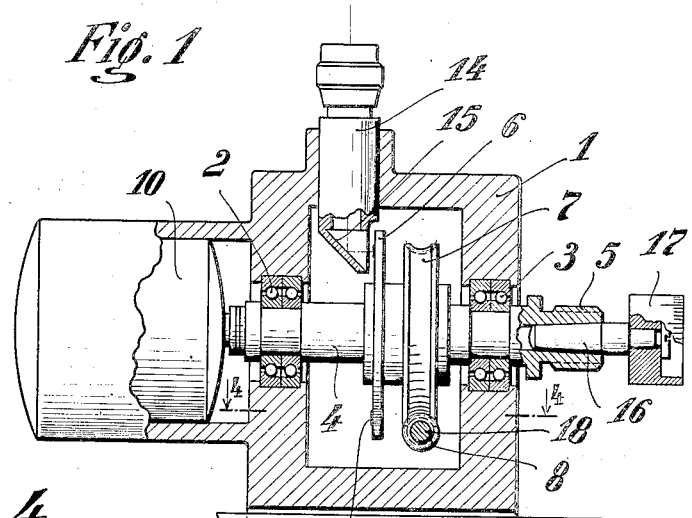
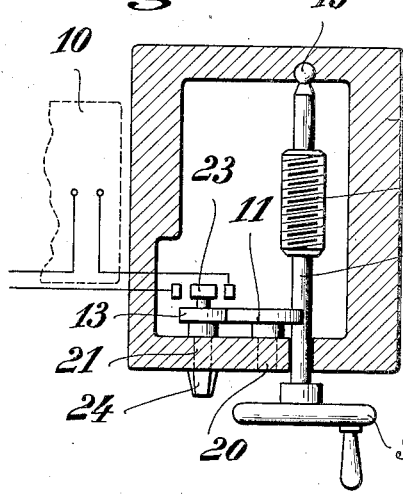
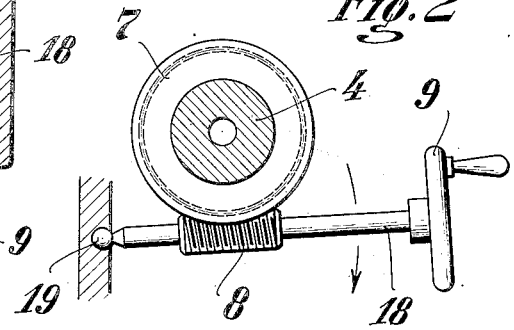
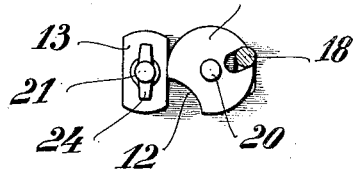
INVENTOR
*Paul Dinkel*
BY
*Ivan E. A. Konigsberg*
ATTORNEY Patented Nov. 12, 1940

2,221,577

UNITED STATES PATENT OFFICE 2,221,577

MACHINE FOR MARKING SCALES ON WORK PIECES

Paul Dinkel, Wetzlar, Germany, assignor, by mesne assignments, to Frank Dumur, Lausanne, Switzerland Application April 8, 1938, Serial No. 200,975
In Germany May 29, 1937

3 Claims. (Cl. 33—19)

This invention relates to machines for marking verniers and scales on work pieces or blanks. Such machines include a standard scale disk which is mounted upon a stepwise operated shaft under the control of optical observation by means of a microscope. The blank to be marked with a scale is attached to a clutch member upon said shaft by means of a special mandrel which is separately prepared for the job in hand. The shaft is rotated to position the blank so that it may be marked with a scale corresponding to the scale upon the standard disk.

The auxiliary mandrel for connecting the blank to the machine is separately prepared for the job in hand. It has been discovered that it is practically impossible even with the greatest care to make the mandrel so accurate that it, after it has been clutched to the machine, will rotate with its entire body in exact concentricity with the axis of the shaft of the scale disk. Hence it is practically impossible to provide the blank with a scale of such exactness as is required. It has been found that the separately prepared mandrel after being mounted on the machine rotates eccentrically and thus nullifies the advantages of an optically controlled scale disk.

This invention has for its object the construction of a scaling machine in which the auxiliary blank carrying mandrel may be turned exactly to conform to the rotary movements of the scale disk shaft and whereby eccentricity and other uneven movements of the mandrel and hence of the blank is eliminated. To this end the invention is embodied in a scaling machine provided with a motor for driving the scale disk shaft while the mandrel is being turned and finished for the job in hand. When the mandrel is finished the power is shut off and at the same time the scale shaft driving means are put into operation. In other words, the scale disk shaft in the machine according to this invention may be power driven when the mandrel is being finished and thereafter operated, manually or by power, while the scale making operation is being carried out. The invention includes means insuring that the two driving means, power or hand actuated, cannot be thrown in at the same time.

In the accompanying drawing illustrating the invention

Fig. 1 is a central vertical sectional view through the machine embodying the invention.

Fig. 2 is a detail view of the scale disk driving means.

Fig. 3 is a detail view of an automatic throw off device.

Fig. 4 is a sectional view on the line 4—4 of Fig. 1 with parts removed.

The reference numeral 1 indicates a suitable housing for the machine provided with ball bearings 2 and 3 for the support of the shaft 4 which carries a clutch cone 5 outside the housing. The shaft 4 carries the scale disk 6 and a worm wheel 7. The latter is in mesh with a worm 8 upon a shaft 18 provided with a handle 9. The shaft 18 has its inner end supported in a bearing 19 located in the housing. The outer portion of the shaft 18 is supported in a disk 11 fixed to a short shaft 20 in the wall of the housing. The disk 11 has a cut out portion 12. A cam 13 is mounted on a shaft 21 and is adapted to engage in the cut out 12 to throw the disk 11 into the position shown in Fig. 3 where the shaft 18 has been elevated to bring the worm 8 into mesh with the worm wheel 7 as in Fig. 2. Or the cam 13 may be rotated anti-clockwise to turn the disk 11 clockwise so as to move the shaft 18 down and disconnect the worm from the worm wheel as will be understood.

To one end of the shaft 21 is secured a tumbler switch 23 which opens and closes the circuit to an electric motor 10 to which the shaft 4 is secured. The electric circuit is indicated in Fig. 4. The shaft 21 is operated from outside the housing by a knob 24. The machine further includes a microscope 14 for observing the scale upon the disk 6 by means of a reflecting mirror 15 in a well known manner. The shaft 4 carries a clutch member 5 adapted to receive the mandrel 16 to which the blank 17 is secured. The scale marks on the disk 6 are indicated by the heavy lines 25.

In operation, when it is desired to provide a blank with a scale, the mandrel 16 is inserted in the clutch 5 in order that it may be turned to rotate with its entire body in exact concentricity with the axis of the shaft 4. The operator then turns the handle or knob 24 into a position at right angle to that shown in Fig. 3 whereby the worm shaft 18 is lowered and the worm 8 is disconnected from the worm wheel 7. As the knob 24 is thus turned the tumbler switch 23 is also turned to close the circuit to the motor in a well known manner and the motor starts. When the mandrel is finished, the operator turns the knob 24 into the position shown in Fig. 3 and thereby opens the circuit and moves the shaft 18 to operatively connect the worm 8 with the worm wheel. The scale making operation is thereafter carried out in a well known manner by stepwise rotation of the shaft 4, the reading of the positions and the scale being done by means of the microscope.

It will be understood that I have disclosed the preferred forms of my invention only as some examples of the many possible ways to practically construct my device and that I may make such changes in its general arrangement and the construction of its minor details as come within the scope of the appended claims without departure from the spirit of my invention and the principles involved.

I claim:

1. In a scale marking machine a shaft, a mandrel for attaching a blank thereto, means for supporting said mandrel on said shaft, a scale disk on the latter, an electric motor for rotating said shaft whereby said mandrel may be turned and finished to rotate with its entire body in exact concentricity with said shaft before the blank is attached thereto, other means for rotating said shaft independent of said motor whereby the blank may be marked with a scale according to said scale disk and mechanism for automatically opening the motor circuit to stop the motor and simultaneously therewith operatively connecting said other means to said shaft and for automatically operatively disconnecting the said other means from said shaft and simultaneously closing the motor circuit to start said motor.

2. In a scale marking machine a shaft, a mandrel for attaching a blank thereto, means for supporting said mandrel on said shaft, a scale disk on the latter, an electric motor for rotating said shaft whereby said mandrel may be turned and finished to rotate with its entire body in exact concentricity with said shaft before the blank is attached thereto, manually actuated means for rotating said shaft independent of said motor whereby the blank may be marked with a scale according to said scale disk and manually actuated mechanism for automatically opening the motor circuit to stop said motor and simultaneously operatively connecting said other means to said shaft and for automatically operatively disconnecting the said other means from said shaft and simultaneously therewith closing the motor circuit to start said motor.

3. A machine according to claim 2 including a microscope for observing the positions of the scale on the scale disk during the operations thereof.

PAUL DINKEL.